United States Patent
Anderson et al.

(10) Patent No.: US 7,093,820 B2
(45) Date of Patent: Aug. 22, 2006

(54) OVER CENTER HIGH DEFLECTION PRESSURE ENERGIZING LOW LEAKAGE SEAL

(75) Inventors: Dean Anderson, Apple Valley, CA (US); William L. Giesler, Phoenix, AZ (US); Brad King, Tempe, AZ (US); Jimmy D. Wiggins, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 57 days.

(21) Appl. No.: 10/827,934

(22) Filed: Apr. 19, 2004

(65) Prior Publication Data

US 2005/0230652 A1    Oct. 20, 2005

(51) Int. Cl.
*F16K 31/44* (2006.01)

(52) U.S. Cl. .................. 251/214; 277/395; 277/647; 277/530; 277/549; 277/552; 277/555; 277/648

(58) Field of Classification Search .............. 277/549, 277/552, 554, 555, 395, 530, 647–649; 251/214
See application file for complete search history.

(56) References Cited

U.S. PATENT DOCUMENTS

| | | | |
|---|---|---|---|
| 2,076,747 A | 4/1937 | Salisbury | |
| 2,684,033 A | 7/1954 | Montgomery et al. | |
| 2,957,735 A | 10/1960 | Snyder | |
| 3,192,942 A * | 7/1965 | Manor et al. | 137/246.19 |
| 3,199,831 A | 8/1965 | Sully | |
| 3,617,027 A * | 11/1971 | Scaramucci | 251/315.01 |
| 3,768,819 A | 10/1973 | Burkert | |
| 4,658,847 A | 4/1987 | McCrone | |
| 4,877,272 A | 10/1989 | Chevallier et al. | |
| 5,354,072 A | 10/1994 | Nicholson | |
| 5,653,447 A * | 8/1997 | Cress | 277/312 |
| 5,799,953 A | 9/1998 | Henderson | |
| 5,813,674 A | 9/1998 | Dickie et al. | |
| 6,007,070 A * | 12/1999 | Heathcott et al. | 277/510 |
| 6,443,459 B1 | 9/2002 | Lebeau et al. | |
| 2002/0117810 A1 | 8/2002 | Schemm | |

FOREIGN PATENT DOCUMENTS

EP    133 928 A    3/1985

OTHER PUBLICATIONS

Shamban, Standard Aerospace Part Number, Reference Guide, 1989 W.S. Shamban & Company.
BAL SEAL Design Manual, BAL SEAL Engineering Company, Inc., Santa Ana, CA.
Sealing Solutions for Reciprocating, Static and Face Applications, BAL SEAL Engineering Reciprocating Seal Catalog DM-6, Foothill Ranch, CA.
PCT International Search Report PCT/US2005/013194, Nov. 8, 2005.

* cited by examiner

*Primary Examiner*—J. Casimer Jacyna
(74) *Attorney, Agent, or Firm*—Ingrassia Fisher & Lorenz

(57) ABSTRACT

A low leakage seal for separating two environments and contacting a component surface is provided. The seal includes a base and an annular rib. The annular rib is coupled to and extends from the base. The annular rib includes at least one contact surface configured to contact the component surface having a plurality of angularly cut radial grooves formed therein. The annular rib flexes and pressure energizes in the presence of a pressure differential between the two environments.

18 Claims, 8 Drawing Sheets

OVER CENTER HIGH DEFLECTION PRESSURE ENERGIZING LOW LEAKAGE SEAL

FIELD OF THE INVENTION

The present invention relates to an air turbine start system, and more particularly, to a low leakage seal for use on an air turbine start system control valve having high differential pressure across the seal.

BACKGROUND OF THE INVENTION

Compressed gas, such as air, is often used for starting an aircraft gas turbine, or jet engine. Compressed air flows to a starter which causes rotation of the compressors and the turbines within the jet engine. When sufficient air flows through the jet engine (which may be reflected by turbine speed or otherwise), jet fuel supplied to the engine can be ignited within the combustion area/combustor to start the engine. Without the compressor/turbine rotation provided by the starter, fuel combustion and air flow through the engine may not be sufficient to start the engine.

The flow of compressed air from the air turbine starter may be controlled by a starter valve, such as an air regulating and shut-off butterfly valve. The starter valve, in turn, may be controlled by a control valve. In some embodiments, the control valve is in fluid communication with an air duct within which the starter valve is disposed and receives a portion of air flowing through the duct to move the starter valve to either an open or a close position. Specifically, the portion of air supplied to the control valve causes a pneumatically-operated actuator assembly that is coupled to the starter valve to move the starter valve in either the open or close direction.

Typically, the air duct and actuator in the starter valve are separated from one another by a seal. The seal serves to prevent particles that may be present in the air duct from migrating in to spaces between the starter valve, the central shaft, and/or the actuator assembly. The seal may also prevent particles from becoming trapped within the spaces of the actuator assembly or embedded in the lubricant that lubricates the bearings mounted on the valve shaft.

At times, the air that flows through the starter valve air duct may be hot and pressurized, while the environment within the actuator assembly is not, thus causing a pressure differential between the starter valve duct and actuator assembly, and consequently, across the seal. In these instances, small quantities of the hot, pressurized air may leak across the seal and into the areas previously mentioned. As a result, temperature-sensitive components within the starter valve, such as, for example, elastomeric diaphragms, may be exposed to the hot, pressurized air, which may cause reduced life of the components. Moreover, the hot, pressurized air may be contaminated with particles which can be embedded in the bearing lubricants mentioned above, causing reduced life of the shaft bearings.

Various seal designs have been employed in attempts to address the aforementioned issues. For example, one type of plastic C-seal having grooving thereon has been used, such as the seal illustrated in FIG. 1. This type of seal 10 is typically referred to as a micro-V enhanced C seal. These seals 10 include a plurality of knife cuts 12, wherein material is not removed from the seal 10, to form a ribbed contact 14 on the seal 10. The knife cuts 12 do not have any axial length or depth variations. When the micro-V enhanced C seal 10 is positioned on a shaft, it may not provide an optimal seal with the surface it contacts because the ribbed contact surface 14 may not deflect with changing pressure. Additionally, the ribbed contact surface 14 may not reduce leakage gaps if a flaw is present on the surface with which the seal 10 contacts.

Another type of seal, such as illustrated in FIG. 2 has been employed wherein the plastic C seal 20 has 45-degree wedges 22 machined into or formed thereon to form a ribbed contact surface 24. However, this design also may not provide optimal sealing against the surface with which the seal contacts because the 45-degree wedges 22 may not deflect sufficiently under pressure when they are radially loaded.

Accordingly, there is a need for a seal that is capable of responding to a pressure differential by providing a tighter or lower leakage seal as compared to presently known seals. Additionally, it is desirable to have a seal capable of preventing hot, pressurized and possibly contaminated air from leaking into the aforementioned areas. Moreover, it is desirable that the seal prevent exposure of the temperature-sensitive components to high temperatures and the valve shaft bearings are kept clean. Furthermore, other desirable features and characteristics of the present invention will become apparent from the subsequent detailed description of the invention and the appended claims, taken in conjunction with the accompanying drawings and this background of the invention.

SUMMARY OF THE INVENTION

The present invention provides a seal for separating two environments having a base and an annular rib. The annular rib is coupled to and extends from the base, and includes a contact surface having a plurality of angularly cut radial undercut grooves formed therein. The annular rib flexes and pressure energizes in the presence of a pressure differential between the two environments.

In another embodiment of the invention, a low leakage seal is provided for separating a first and a second environment. The seal comprises a base, first and second annular ribs, and a spring. The first and second annular ribs are coupled to and extend from the base. The first and second annular ribs are spaced apart from one another to form a cavity therebetween. The first annular rib includes a contact surface having a plurality of angularly cut radial grooves formed therein. The spring is disposed within the cavity and configured to provide a biasing force against the first and second annular ribs. The first and second annular ribs flex and pressure energize in the presence of a pressure differential between the first and second environments.

In another embodiment, and by way of example only, an air turbine starter control valve is an actuator, a shaft, a valve, and a seal. The shaft is coupled to the actuator, the valve is coupled to the shaft, and the seal is axially mounted on the shaft and located between the actuator and the valve. The seal comprises a base, first and second annular ribs, and a spring. The first and second annular ribs are coupled to and extending from the base. The first and second annular ribs are spaced apart from one another to form a cavity therebetween. The first annular rib includes at least one contact surface configured to contact the shaft. The contact surface has a plurality of angularly cut radial grooves formed therein. The spring is disposed within the cavity and configured to provide a biasing force against the first and second annular ribs. The first and second annular ribs flex and pressure energize in the presence of a pressure differential between the actuator and the valve.

In yet another embodiment, and by way of example only, a fluid control valve is provided. The fluid control valve includes a poppet and a seal. The poppet has first and second ends and is configured to travel axially along a predetermined axis in response to a pressure exerted thereon. The seal is positioned concentric to the poppet between the poppet first and second ends and comprises a base and an annular rib. The annular rib is coupled to and extends from the base, and includes at least one contact surface configured to contact the poppet. The at least one contact surface has a plurality of angularly cut radial undercut grooves formed therein. The annular rib flexes and pressure energizes in the presence of a pressure differential between the poppet first and second ends.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a rotating machine. Thus, although the present invention is depicted and described as being implemented in a turbine starter valve and a fluid control valve, it should be appreciated that it can be implemented in numerous other parts of various other devices and/or machines that use one or more ring-type seals, including, but not limited to, a gas turbine engine, a hydraulic pump, a water pump, or various other chemical and industrial pumps. The present invention can be used in rotary, axial reciprocating, rotary oscillating or axial dither configurations in addition to axial valve seal-locations. Additionally, the technology described herein may be implemented in numerous contexts, including, but not limited to, carbon face seal secondary seals, rubber or plastic (polytetrafluroethylene) automotive face seals (such as those used to prevent dust and water intrusion into axle wheel bearings), bladder seals, check valves, valve seats of axial stroking valves, chemical liquid or gas control valves, rotating shaft lip seals for fluid pumps and metal seals, just to name a few. For the present context and ease of explanation, a general description of the starter control valve will first be provided.

Figure 1:
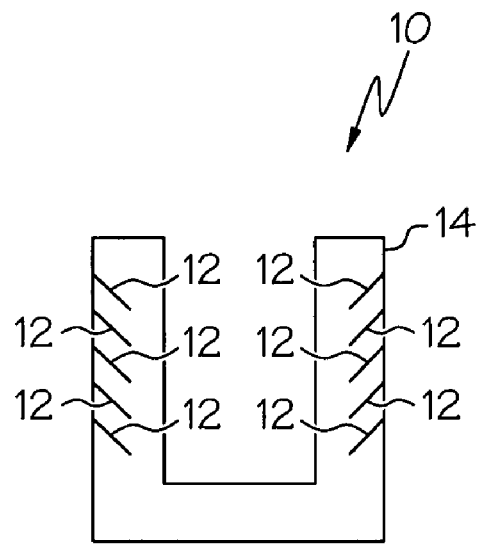
FIG. 1 is a schematic view of a prior art seal.
Figure 2:
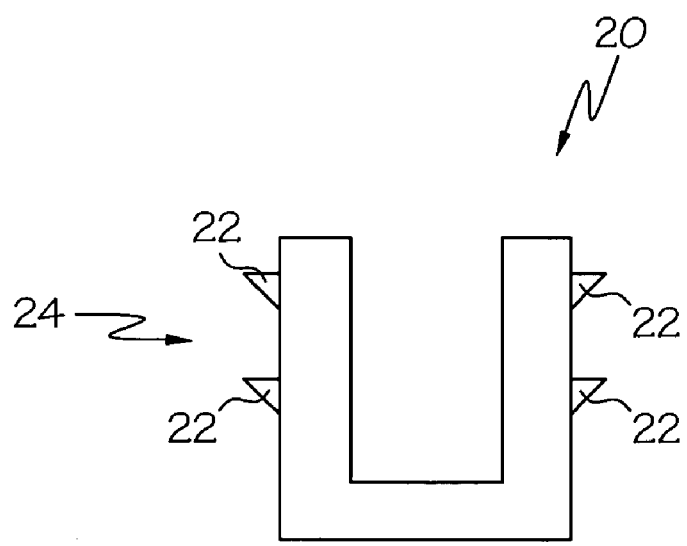
FIG. 2 is a schematic view of another prior art seal.
Figure 3:
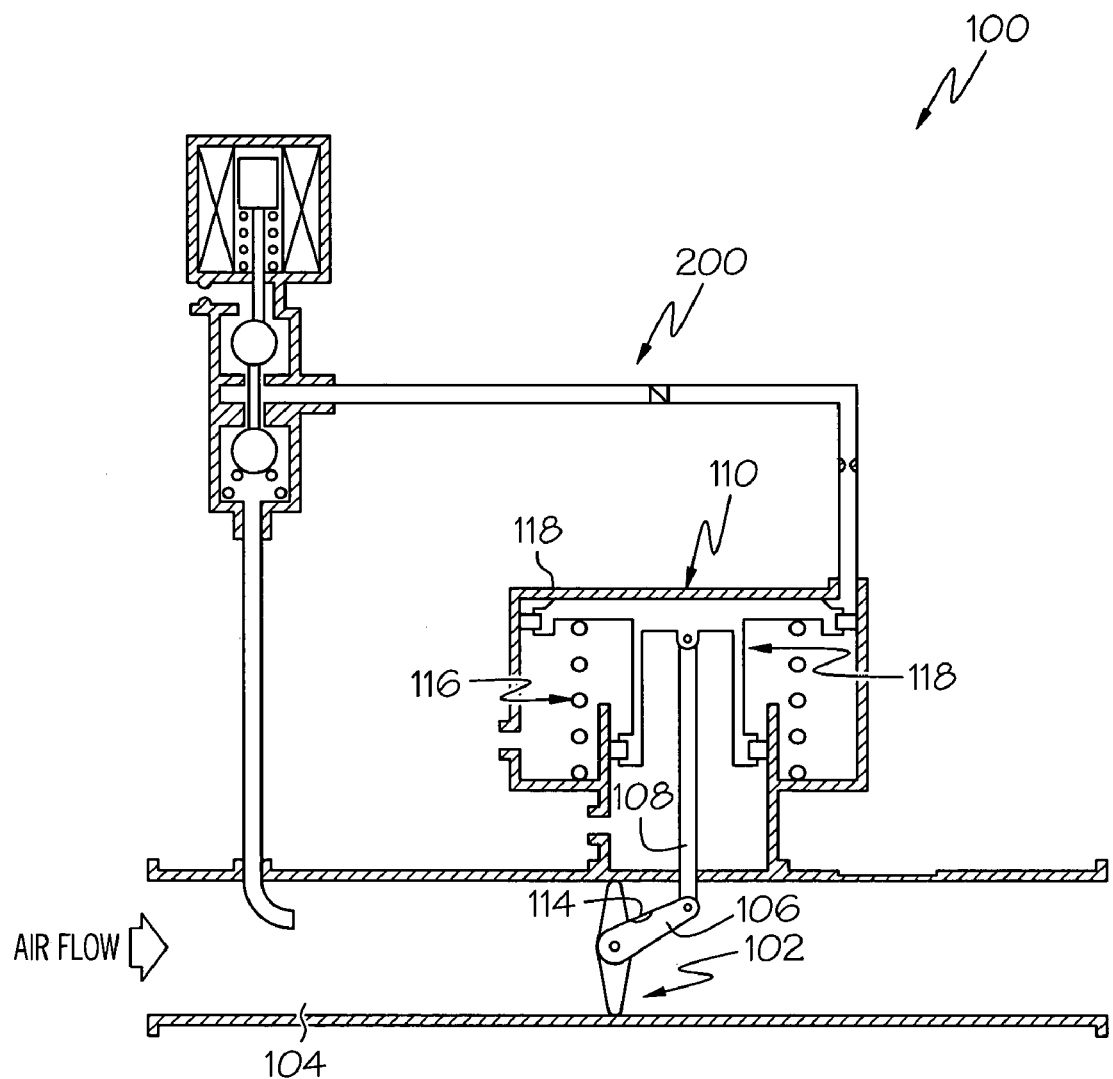
FIG. 3 is a schematic and cutaway view of a starter control valve within which an exemplary seal may be used.

Turning now to FIG. 3, a schematic of an exemplary starter control valve 100 is shown. The starter control valve 100 has a butterfly valve 102 that is controlled by a control valve 200. The butterfly valve 102 is disposed within a duct 104 and is moveable between an open and a closed position, to thereby open and close the duct 104, respectively, to in turn control the flow of the pressurized air to, for example, an air turbine starter (not shown). The duct 104 may be in fluid communication with any one of various sources of pressurized or compressed air, such as, for instance, an auxiliary power unit, bleed air from the compressor stage of another operating gas turbine engine, or a gas turbine ground power cart. The butterfly valve 102 generally has a perimeter that conforms to the inner geometry of the duct 104, such as, generally circular, and is coupled to a shaft 106 which is in turn coupled to an actuator rod 108. The actuator rod 108, in turn, is coupled to a pneumatically-operated actuator 110 that is configured to apply torque about the shaft 106 (shown in FIG. 5) and consequently upon the butterfly valve 102. A torsion spring 114, and a return spring 116 in the actuator 110, urge the butterfly valve 102 toward the closed position.

Figure 4:
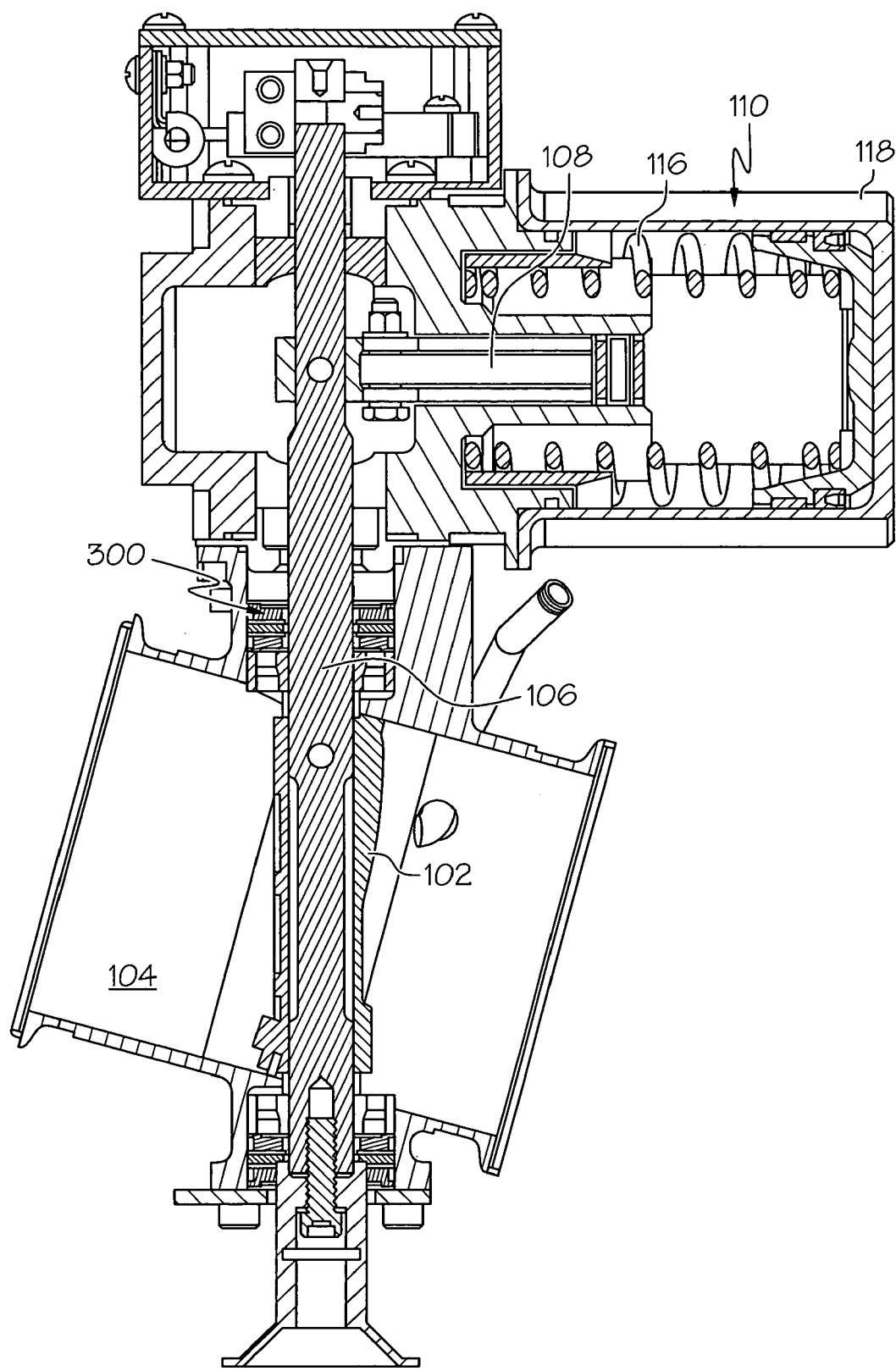
FIG. 4 is a cross section view of the portion of the starter housing including an exemplary embodiment of the seal under normal operating conditions.

In FIG. 4, the actuator 110 is shown adjacent to the butterfly valve 102 and is generally disposed within a common housing 118 positioned above or outside the duct 104. The actuator 110 may be positioned vertically, horizontally, or otherwise, or in any one of numerous other configurations.

Figure 5:
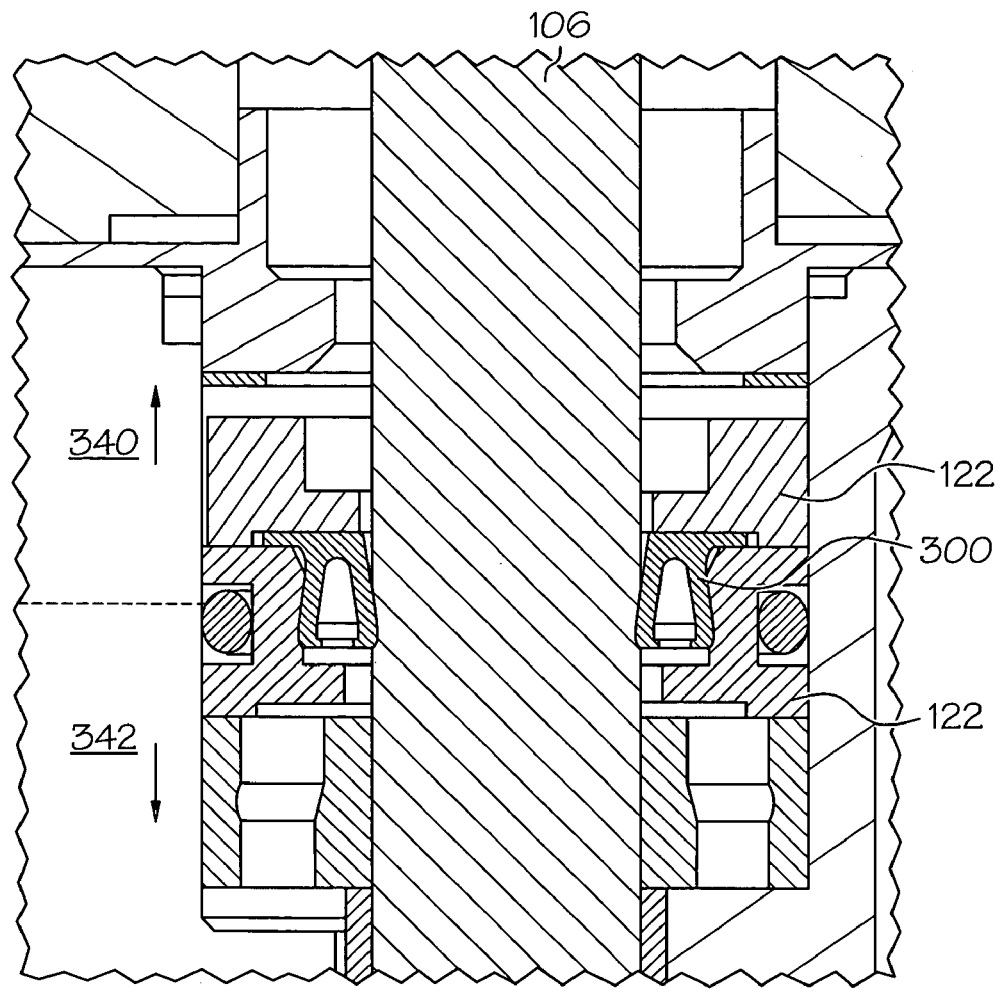
FIG. 5 is a close up view of the portion of the starter housing including an exemplary embodiment of the seal assembly.

As FIG. 4 additionally shows, the actuator 110 and duct 104 are separated from one another via a seal 300. Referring to FIG. 5, a close up view of the seal 300 within the starter control valve 100 is provided. Seal 300 is coaxially mounted about the shaft 106 and is retained in position between glands 122. The seal 300 is generally configured to be pressure-energized, such that it responds to a pressure differential that may exist between the environments that it separates.

Figure 6:
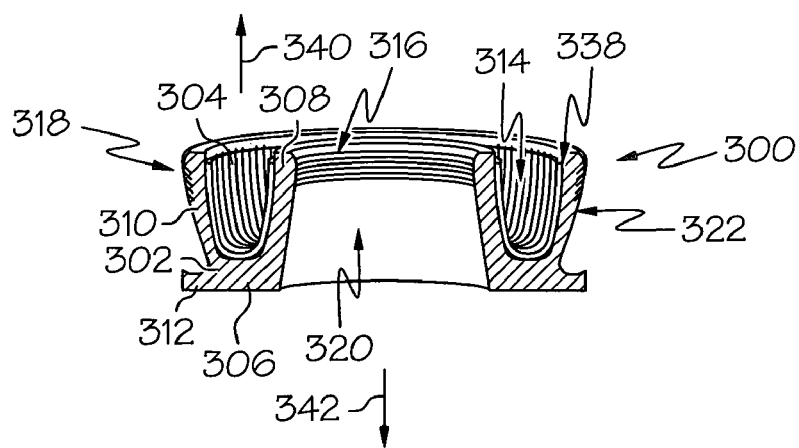
FIG. 6 is a cross-section of an exemplary seal.

FIG. 6 illustrates a cross-section view of the seal 300 in more detail. The seal 300 includes a jacket 302 and a spring 304. Generally, the jacket 302 is annular or ring-shaped and includes a ring-shaped base 306 from which inner and outer annular ribs 308, 310 protrude. The ring-shaped base 306 optionally includes an annular foot 312 that extends away from the outer annular rib 310, which facilitates charging of the seal 300 between the glands 122. The spring 304 is disposed within an annular cavity 314 that is formed between the inner and outer annular ribs 308, 310. Each of these parts will now be discussed in more detail.

The jacket 302 is preferably constructed of high performance polymeric material that has desirable characteristics such as low friction, variable temperature capabilities, high pressure rating and permanent elasticity. The materials can be filled or unfilled polytetrafluoroethylene, KEL F, UHMW, rubber, elastomer or any one of numerous other high moduli, thermoplastic materials capable of being cut during seal 300 construction and that allow flexibility between such cuts in response to a pressure differential. Alternatively, depending on the application for which the seal 300 is used, it may be desirable to construct the seal 300 from flexible metals having spring-like properties, such as steel, brass, or bronze. The jacket 302 is preferably injection-molded into shape for high production volume applications, or machined from bar stock for low production volume applications.

The inner and outer annular ribs 308, 310 are configured to be pressure energized such that when a pressure is exerted on one side of the seal 300, the load on the ribs 308, 310 increases and thereby increases the seal contact with an adjacent wall. To further enhance seal contact, the inner and outer annular ribs 308, 310 each have a plurality of undercut grooves 316, 318 angularly cut at least those portions of the inner and outer annular ribs 308, 310 that will contact air adjacent surface. The plurality of undercut grooves 316, 318 are cut from the inner peripheral wall 320, in the case of the inner annular rib 308, and the outer peripheral wall 322, in the case of the outer annular rib 310. Alternatively, the undercut grooves 316 are cut into either the inner or outer annular rib 308, 310, but not both. As the undercut grooves 316, 318 of both annular ribs 308, 310 are generally the same, a description herein is given of the outer annular rib 310 and its corresponding plurality of undercut grooves 318 with an understanding that the same elements and structures also apply to the inner annular rib 308 and plurality of undercut grooves 316.

The addition of the plurality of undercut grooves 318 increases the flexibility of the seal contact surface and reduces the clearance gap between the seal 300 and the surface to be contacted. In one embodiment, the undercut grooves 318 are preferably added to the jacket 302 after it has been injection-molded and are made by removing material from the outer peripheral wall of the annular rib 310 so that at least one flange 326 (shown more clearly in FIGS. 7A–7C) is formed from the remaining annular rib 310 material. Preferably, the undercut grooves 318 are configured such that the portion of the flange 326 closest to the contact surface is thinner than the remaining portions of the flange 326.

Figure 7A:
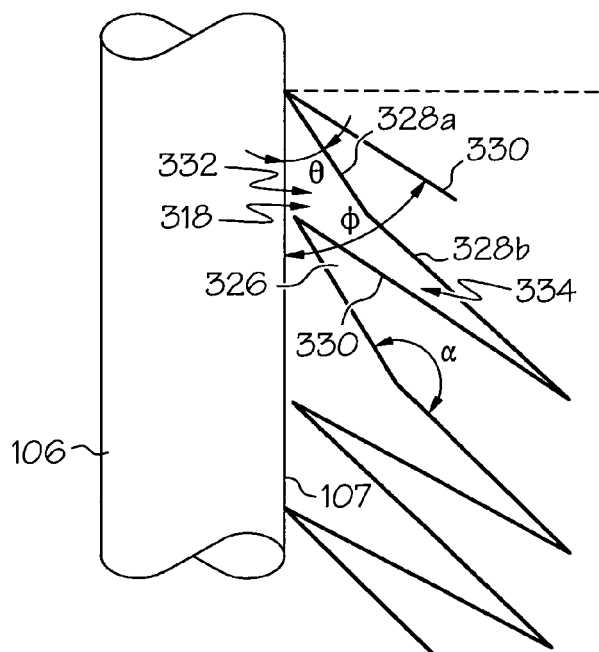
FIGS. 7A–7C are schematic representations of various embodiments of seals according to the present invention, each having a plurality of grooves.

In one embodiment, depicted in FIG. 7A, one or more of the undercut grooves 318 include two adjoining cut sections 332, 334. Thus, each undercut groove 318 includes three edges, edges 328a, 328b, 330. Two of the edges 328a, 328b are adjoined at an angle α. With this embodiment, when the seal 300 is disposed against a component surface 107, a first angle θ is formed between the component surface 107 and the edge 328a and a second angle ϕ is formed between the component surface 107 to and the edge 330. Preferably, the first angle θ0 is between about 2 and 90 degrees, and most preferably about 15 degrees for flexibility and pressure energization. The second angle ϕ is preferably between 2 and 90 degrees, and most preferably about 45 degrees. Those skilled in the art will appreciate that the shape of the undercut groove 318, the cut sections 332, 334 and thus the edges 328a, 328b need not be straight or beveled and can be curved or any other arbitrary form, so long as the flange 326 is capable of flexing as a cantilever to increase the deflection abilities of the seal itself.

Figure 7B:
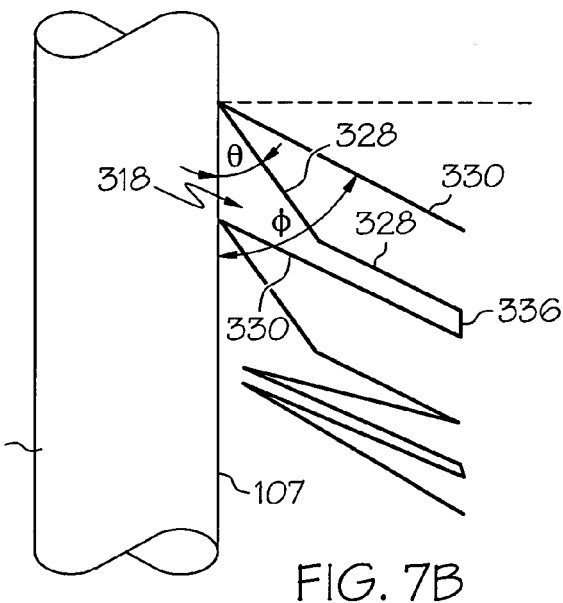

In yet another embodiment, depicted in FIG. 7B, the edges 328, 330 are joined to one another via yet another edge 336. A portion of the undercut groove 318 is thus U-shaped. The angles at which the edges 328, 330, 336 are adjoined, or at which the groove 318 is cut and the depth of the cut may depend, in part, on the type of material that is used to construct the seal 300 and the overall dimensions of the seal.

Figure 7C:
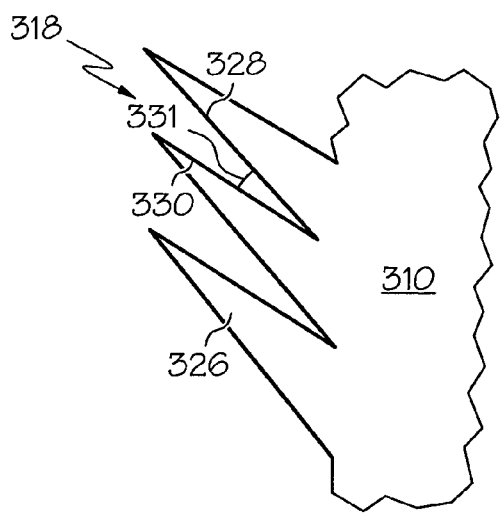

In yet another embodiment depicted in FIG. 7C, each undercut groove 318 includes two edges 328, 330 that adjoin one another at an angle 331. The angle 331 at which the two edges 328, 330 meet is preferably between about 2 and 75 degrees, and most preferably between about 10 and 15 degrees.

Although in the embodiment shown in FIG. 7A, each undercut groove 318 is illustrated as including two cut sections 332, 334, it will be appreciated that one cut section or more than two cut sections may be cut out of the annular rib 310, so long as the increased flexibility of the seal 300 contact surface is maintained. Moreover, the number of undercut grooves 318 can vary from configuration to configuration, which can be dependent upon the application of the seal 300. In the exemplary embodiment shown in FIG. 5, the seal 300 is used in a high-pressure differential environment, thus, more grooves are employed to increase flexibility of the jacket 302.

The plurality of undercut grooves 318 can be substantially equally spaced apart from one another and similarly shaped as shown in FIG. 7A. Alternatively, the plurality of undercut grooves 318 can each be cut at different angles and unequally spaced, such as shown in FIG. 7B. In yet another alternative embodiment, the plurality of undercut grooves 318 can combine both equal spacing and similar shape in one portion and irregular spacing and dissimilar shape in another portion, shown in FIG. 7C. In any event, the flanges 326, work together to allow the annular rib 310 to flex in response to pressure differentials across the seal and increase contact between the seal 300 and the surface to which it is adjacent.

Figure 8:
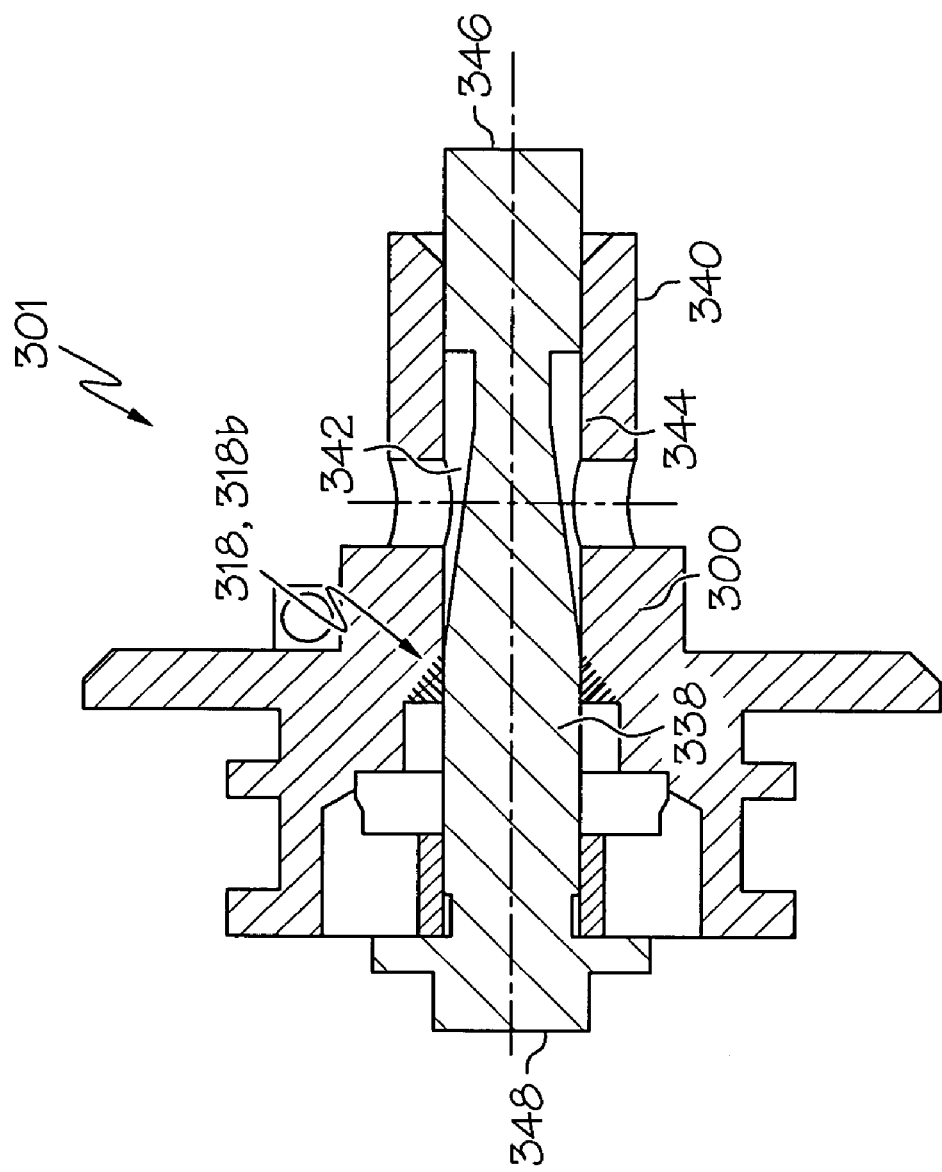
FIG. 8 is a cross-section of a fluid control poppet valve within which an exemplary embodiment of the seal may be employed.
Figure 8A:
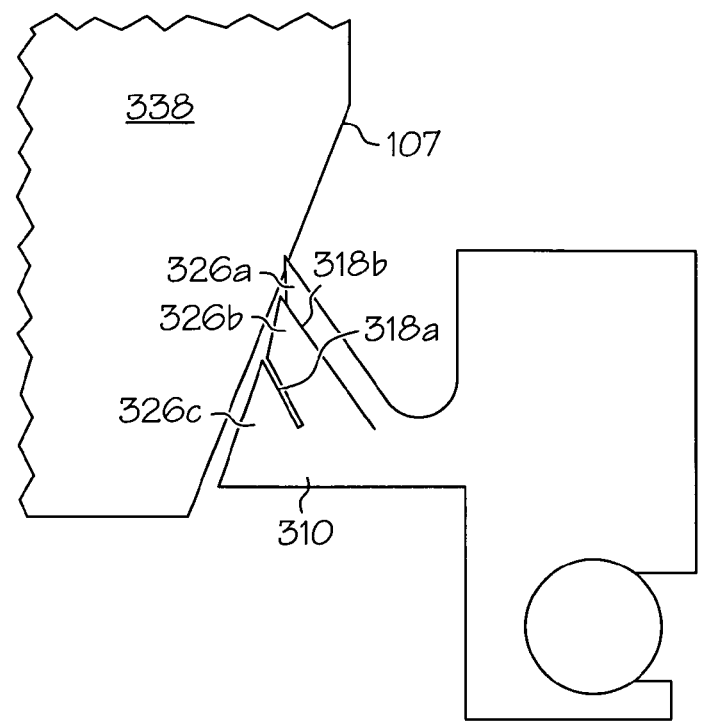
FIGS. 8A–8B are schematics depicting various embodiment of seals according to the present invention that may be employed in the fluid control poppet valve of FIG. 8.
Figure 8B:
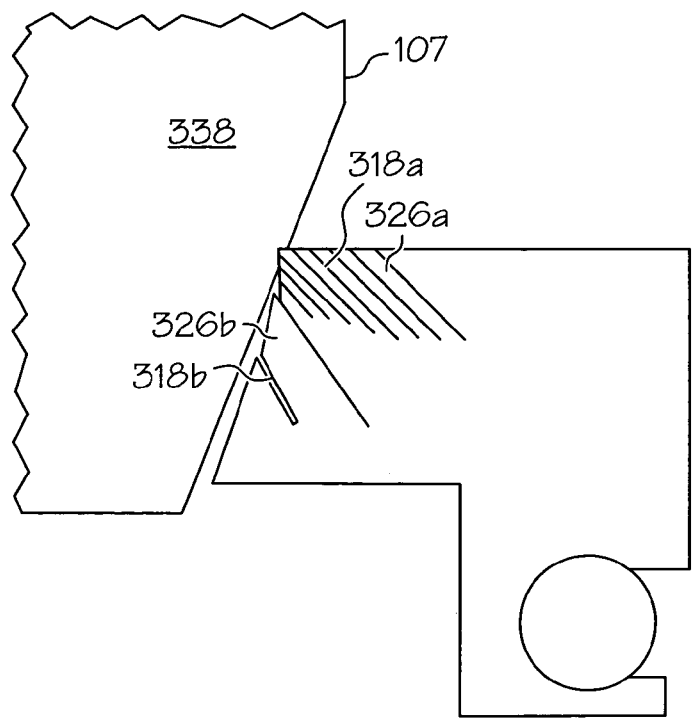

Additionally, although the grooves 318 are preferably made by removing material 318a, the grooves 318 can be cuts or slits 318b made in the rib 310, such as shown in FIGS. 8A and 8B. As will be appreciated, a combination of both types of grooves may also be employed. The depth of each undercut groove 318, the distance between each groove 318, and the length of each flange 326a–c may be varied. Moreover, the depth of each slit 318b can also be varied. These variations increase the flexibility of the contact surface to better seal with the surface to which the seal 300 is adjacent.

In the embodiment illustrated in FIGS. 8A and 8B, the seal 300 is employed in a fluid control valve 301. As shown in FIG. 8, the fluid control valve 301 comprises a poppet valve seat 338 and housing 340. The housing 340 has a cavity 342 that defines, in part, a guide surface 344. The poppet seat 338 is disposed within the housing cavity 342 and has first and second ends 346, 348 that, in the existence of a pressure differential between the first and second ends 346, 348, causes the poppet seat 338 to move in the cavity 324 in an axial direction. The seal 300 is located axial or concentric of the poppet valve seat 338 and is in contact with at least a portion of the poppet surface.

Turning to FIG. 8A, as illustrated therein, the contact angle between the surface to be contacted 107, in this case, the poppet valve seat 338, and the seal 300 closes as pressure increases to increase the flexibility of the contact surface. The distances between each groove 318 or slit 318b are varied such that the section of the contact surface in closest proximity to exposure to pressure are shorter than the section furthest from the pressure so that they are more flexible and able to provide leakage protection. The grooves that are further from the pressure provide increased load support as the pressure drops across the seal.

In yet another embodiment, referring to FIG. 8B, each flange 326a, 326b increasingly closes in on the surface to be contacted 107, which is, in this embodiment, the poppet valve seat 338. Additionally, the configuration of the grooves 318 is such that the thinner flanges 326a are located closer to the section that is more immediately exposed to pressure, while the thicker flanges 326b are adjacent the thinner flanges 326a. Similar to the embodiment in FIG. 8A, the thinner flanges 326a serve to lower leakage, while the thicker flanges 326b support the load resulting from a pressure change from one side of the seal to the other.

Moreover, each groove 318 can be made either radially 318*b* or axially 318*a*, which is also depicted in FIG. 8B.

Figure 9:
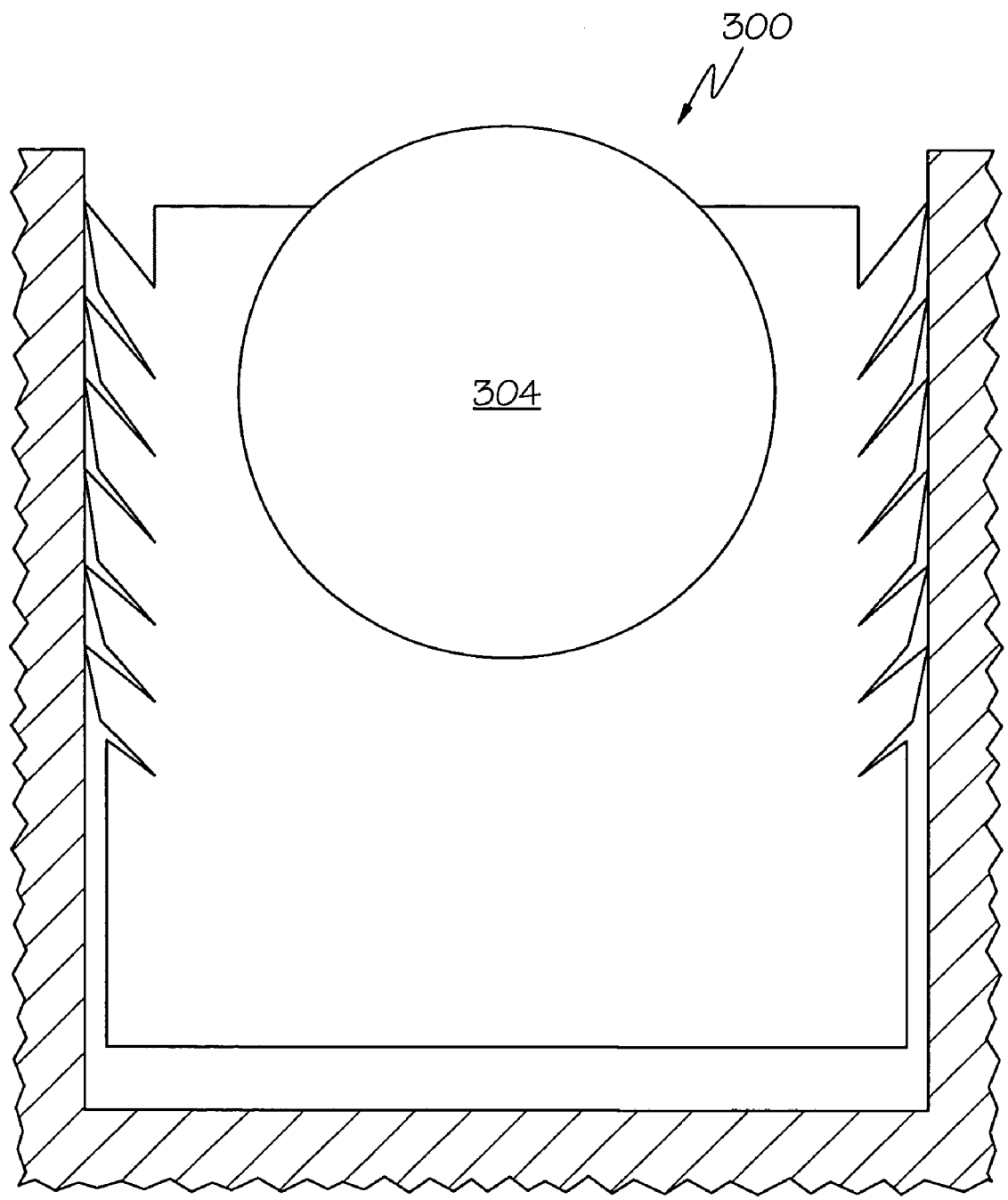
FIG. 9 is a schematic of yet another exemplary seal.

Turning back to FIG. 6, the peripheral walls 320, 322 of the inner and outer annular ribs 308, 310 each include at least one protrusion 338 that extends over the cavity 314 and aids in keeping the spring 304 disposed therein. The spring 304 is ring-shaped and configured to provide a biasing force against the inner and outer annular ribs 308, 310 so as to provide a tight seal against adjacent surrounding surfaces. When little to no pressure differential exists between the two environments that are sealed by the seal 300, in this embodiment, the actuator environment 340 and the duct environment 342 (illustrated in FIG. 4), or the two sides of the seal 300, the spring 304 provides the load for biasing the ribs into their adjacent surroundings. The spring 304 can be configured in any one of numerous shapes, such as, a coiled wire or ribbon. The spring can be constructed from any metal having spring-like properties, such as stainless steel. In the exemplary seal 300 in FIG. 6, the spring 304 is a U-shaped ribbon having radial cuts that alternate from one side of the U to the other to improve the spring-like properties of the spring 304. The spring 304 can alternatively be constructed of an elastomer, such as, for example, an o-ring, shown in FIG. 9.

The seal 300 may be manufactured by one of numerous methods. In one embodiment of one of the methods, the seal 300 is formed by a lathe operation. The lathe may include a lathing tool having the desired seal shape formed thereon that cuts the appropriate shape into a material from which the seal will be made. The lathing tool may be formed by using a cutting tool having a partial arc reverse image of the surface of the seal, to cut a desired seal shape into one end of a plastic rod. The cutting tool is moved in a simultaneous axial and radial direction during the cutting operation so that angles (θ, φ, and α, illustrated in FIGS. 7A–7B) may be properly imparted to the lathing tool, and thus, to the seal 300. When the lathe is used to form the seal 300, preferably, in the event that more than one rib 308 will be formed into the seal 300, the cavity 314 is formed last to allow the seal being machined to be stiff during the lathe operation.

In another embodiment, the seal 300 includes a plurality of varying knife cuts. In such an embodiment, a standard knife cutter may be used to provide knife cuts having variable axial and radial depth cuts onto the seal 300. In yet another embodiment, a CNC lathe may be used and programmed to plunge a knife at various axial locations, various radial depths, and various θ angles as required to form the flexibility desired at any given location on the seal.

Thus, a seal has been provided that is capable of responding to a pressure differential by providing a tighter seal against a surface to which it is adjacent. Additionally, the improved seal is capable of preventing hot, pressurized and possibly contaminated air from leaking into undesirable areas, such as near temperature-sensitive components and the valve shaft bearings.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A seal for separating a first and second environment, comprising:
   a base; and
   an annular rib coupled to and extending from the base, the annular rib including a contact surface having a plurality of angularly cut radial undercut grooves formed therein, each groove having a radial depth, and at least two of the grooves having radial depths that are not equal, the annular rib configured to flex and pressure energize in the presence of a pressure differential between the first and second environments.

2. The seal of claim 1, wherein the at least one of the plurality of grooves is V-shaped.

3. The seal of claim 1, wherein the plurality of grooves are equally spaced along the contact surface.

4. The seal of claim 1, wherein:
   each groove of the plurality of grooves has first and second edges; and
   when the annular rib is disposed adjacent a surface, a first angle is formed between the surface and the first edge and a second angle is formed between the surface and the second edge.

5. The seal of claim 4, wherein the first angle is between about 2 and 90 degrees and the second angle is between about 2 and 90 degrees.

6. A seal for separating a first and second environment, comprising:
   a base; and
   first and second annular ribs coupled to and extending from the base, the first and second annular ribs spaced apart from one another to form a cavity therebetween, the first annular rib including a contact surface having a plurality of angularly cut radial undercut grooves formed therein, each groove having a radial depth, and at least two of the grooves having radial depths that are not equal, the first and second annular ribs each configured to flex and pressure energize in the presence of a pressure differential between the first and second environments.

7. The seal of claim 6, wherein the at least one of the plurality of grooves is V-shaped.

8. The seal of claim 6, wherein the plurality of grooves are equally spaced along the contact surface.

9. The seal of claim 6, wherein:
   each groove of the plurality of grooves has first and second edges; and
   when the first annular rib is disposed adjacent a surface, a first angle is formed between the component surface and the first edge and a second angle is formed between the component surface and the second edge.

10. The seal of claim 9, wherein the first angle is between about 2 and 90 degrees and the second angle is between about 2 and 90 degrees.

11. The seal of claim 6, wherein the base further includes an annular foot that extends radially therefrom.

12. An air turbine starter control valve, comprising:
   an actuator;
   a shaft coupled to the actuator;
   a valve coupled to the shaft; and
   a seal axially mounted on the shaft and located between the actuator and the valve, the seal comprising:
   a base; and first and second annular ribs coupled to and extending from the base, the first and second annular ribs spaced apart from one another to form a cavity therebetween, the first annular rib including a contact surface configured to contact the shaft, the contact surface having a plurality of angularly cut radial undercut grooves formed therein, each groove having a radial depth, and at least two of the grooves having radial depths that are not equal, the first and second annular ribs configured to flex and pressure energize in the presence of a pressure differential between the actuator and the valve.

13. The air turbine starter control valve of claim 12, further comprising a spring disposed within the cavity, the spring configured to provide a biasing force against the first and second annular ribs.

14. A fluid control valve, comprising:
  a poppet having first and second ends and configured to travel axially along a predetermined axis in response to a pressure excited thereon; and
  a seal positioned concentric to the poppet between the poppet first and second ends, the seal comprising:
  a base; and
  an annular rib coupled to and extending from the base, the annular rib including a contact surface configured to contact a surface of the poppet, the contact surface having a plurality of angularly cut radial undercut grooves formed therein, each groove having a radial depth, and at least two of the grooves having radial depths tat are not equal, the annular rib configured to flex and pressure energize in the presence of a pressure differential between the poppet first and second ends.

15. The fluid control valve of claim 14, wherein the at least one of the plurality of grooves is V-shaped.

16. The fluid control valve of claim 14, wherein the plurality of grooves are equally spaced along the contact surface.

17. The fluid control valve of claim 14, wherein:
  each groove of the plurality of grooves has first and second edges; and
  a first angle is formed between the poppet surface and the first edge and a second angle is formed between the poppet surface and the second edge.

18. The fluid control valve of claim 17, wherein the first angle is between about 2 and 90 degrees and the second angle is between about 2 and 90 degrees.

* * * * *

UNITED STATES PATENT AND TRADEMARK OFFICE
CERTIFICATE OF CORRECTION

PATENT NO. : 7,093,820 B2
APPLICATION NO. : 10/827934
DATED : August 22, 2006
INVENTOR(S) : Dean Anderson et al.

It is certified that error appears in the above-identified patent and that said Letters Patent is hereby corrected as shown below:

Column 10, line 5, "tat" should be changed to --that--.

Signed and Sealed this

Tenth Day of April, 2007

JON W. DUDAS
*Director of the United States Patent and Trademark Office*